(12) United States Patent
Vegas et al.

(10) Patent No.: US 11,589,100 B1
(45) Date of Patent: Feb. 21, 2023

(54) ON-DEMAND ISSUANCE PRIVATE KEYS FOR ENCRYPTED VIDEO TRANSMISSION

(71) Applicant: Amazon Technologies, Inc., Seattle, WA (US)

(72) Inventors: Matthew Rives Vegas, Portland, OR (US); Andrew D. Henroid, Portland, OR (US); Akhil Ramachandran, Hillsboro, OR (US); Brian J. Rundle, Portland, OR (US); Darin J. Klaas, Beaverton, OR (US); Kevin Moore, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 17/219,053

(22) Filed: Mar. 31, 2021

(51) Int. Cl.
| | |
|---|---|
| *H04N 21/266* | (2011.01) |
| *H04L 9/08* | (2006.01) |
| *H04N 21/6336* | (2011.01) |
| *H04N 21/6379* | (2011.01) |

(52) U.S. Cl.
CPC ..... *H04N 21/26613* (2013.01); *H04L 9/0825* (2013.01); *H04N 21/6336* (2013.01); *H04N 21/6379* (2013.01)

(58) Field of Classification Search
CPC ......... H04N 21/26613; H04N 21/6336; H04N 21/6379; H04L 9/0825
See application file for complete search history.

(56) References Cited

U.S. PATENT DOCUMENTS

| | | | | |
|---|---|---|---|---|
| 5,635,978 A | * | 6/1997 | Alten | H04N 7/025 725/43 |
| 5,867,131 A | * | 2/1999 | Camp, Jr. | H01Q 1/24 343/702 |
| 6,889,325 B1 | * | 5/2005 | Sipman | H04L 63/126 380/37 |
| 7,653,921 B2 | * | 1/2010 | Herley | H04N 21/4332 382/199 |
| 7,991,770 B2 | * | 8/2011 | Covell | H04N 7/17336 707/758 |

(Continued)

OTHER PUBLICATIONS

"Network." Merriam-Webster.com Dictionary, Merriam-Webster, https://www.merriam-webster.com/dictionary/network. Accessed Sep. 8, 2022. (Year: 2022).*

(Continued)

*Primary Examiner* — Michael B. Pierorazio
(74) *Attorney, Agent, or Firm* — Nicholson De Vos Webster & Elliott LLP

(57) ABSTRACT

Techniques for on-demand issuance of private keys for encrypted video transmission are described. A video processing service of a provider network receives a request from a computing device outside the provider network to begin video processing of video data generated by a video source device outside the provider network. The video processing service sends instructions to a video encoding device associated with the video source device to establish the connection for video transmission. The video processing service sends an encryption key to the video encoding device, and sends a decryption key to a video decryption engine. Subsequently, the video processing service receives video data from the video source device, via the video encoding device.

20 Claims, 9 Drawing Sheets

(56) References Cited

U.S. PATENT DOCUMENTS

| Patent/Pub. No. | Date | Inventor | Classification |
|---|---|---|---|
| 8,190,435 B2* | 5/2012 | Li-Chun Wang | G10L 15/26 704/270 |
| 8,462,982 B2* | 6/2013 | Colaitis | H04N 19/467 382/100 |
| 8,510,770 B1* | 8/2013 | Oztaskent | H04N 21/4788 709/201 |
| 9,119,708 B2* | 9/2015 | Wanderer | A61F 5/08 |
| 10,560,728 B2* | 2/2020 | Cain | H04L 65/762 |
| 10,848,473 B1* | 11/2020 | James | H04L 63/10 |
| 2002/0072982 A1* | 6/2002 | Barton | G06Q 30/0625 705/14.1 |
| 2004/0055009 A1* | 3/2004 | Hayashida | H04N 21/47 725/39 |
| 2004/0143349 A1* | 7/2004 | Roberts | G06F 16/40 704/278 |
| 2004/0163110 A1* | 8/2004 | Won | H04N 21/435 725/50 |
| 2005/0028195 A1* | 2/2005 | Feinleib | H04N 7/163 725/135 |
| 2005/0144455 A1* | 6/2005 | Haitsma | G06F 16/634 713/176 |
| 2005/0192863 A1* | 9/2005 | Mohan | G06Q 30/02 705/14.27 |
| 2006/0224452 A1* | 10/2006 | Ng | G06Q 30/0226 705/14.27 |
| 2006/0256133 A1* | 11/2006 | Rosenberg | G06F 3/013 345/619 |
| 2007/0124756 A1* | 5/2007 | Covell | H04N 21/858 348/E7.071 |
| 2007/0179850 A1* | 8/2007 | Ganjon | G06Q 30/0236 705/14.27 |
| 2007/0212019 A1* | 9/2007 | Kimura | H04N 21/84 386/291 |
| 2008/0049704 A1* | 2/2008 | Witteman | H04H 60/58 370/342 |
| 2008/0082510 A1* | 4/2008 | Wang | H04H 60/40 |
| 2009/0313670 A1* | 12/2009 | Takao | H04N 21/47 725/110 |
| 2010/0114713 A1* | 5/2010 | Anderson | G06Q 20/10 705/14.69 |
| 2011/0071838 A1* | 3/2011 | Li-Chun Wang | G11B 27/28 704/E11.001 |
| 2011/0129114 A1* | 6/2011 | Colaitis | H04N 19/70 382/100 |
| 2011/0273455 A1* | 11/2011 | Powar | G11B 27/10 345/473 |
| 2011/0283319 A1* | 11/2011 | Davis | H04N 21/2665 725/39 |
| 2012/0079514 A1* | 3/2012 | Riedl | H04N 21/4334 725/5 |
| 2012/0295560 A1* | 11/2012 | Mufti | H04B 13/00 455/95 |
| 2012/0297400 A1* | 11/2012 | Hill | G06F 9/445 719/318 |
| 2012/0316969 A1* | 12/2012 | Metcalf, III | G06Q 30/0269 705/14.66 |
| 2013/0029762 A1* | 1/2013 | Klappert | A63F 13/792 463/31 |
| 2013/0031579 A1* | 1/2013 | Klappert | H04N 21/454 725/32 |
| 2013/0042262 A1* | 2/2013 | Riethmueller | H04N 21/25866 725/14 |
| 2013/0044051 A1* | 2/2013 | Jeong | H04N 21/44218 345/156 |
| 2013/0067512 A1* | 3/2013 | Dion | H04N 21/812 725/32 |
| 2013/0073366 A1* | 3/2013 | Heath | G06Q 30/0261 705/14.25 |
| 2013/0073377 A1* | 3/2013 | Heath | G06Q 30/02 705/14.39 |
| 2013/0080242 A1* | 3/2013 | Alhadeff | G06F 16/957 705/14.39 |
| 2013/0080262 A1* | 3/2013 | Scott | G06Q 30/02 705/14.68 |
| 2013/0085828 A1* | 4/2013 | Schuster | G06Q 30/0207 705/14.39 |
| 2013/0111519 A1* | 5/2013 | Rice | G06Q 30/02 725/34 |
| 2013/0124073 A1* | 5/2013 | Ren | G01C 21/3694 701/118 |
| 2014/0196070 A1* | 7/2014 | Moskowitz | H04N 21/6582 725/19 |
| 2015/0082349 A1* | 3/2015 | Ishtiaq | H04N 21/812 725/40 |
| 2015/0143416 A1* | 5/2015 | On | H04N 21/8358 725/34 |
| 2015/0222950 A1* | 8/2015 | Sant | H04N 21/84 725/18 |
| 2015/0229979 A1* | 8/2015 | Wood | H04N 21/4663 725/14 |
| 2016/0165307 A1* | 6/2016 | Lavender | H04N 21/4627 725/29 |
| 2018/0184160 A1* | 6/2018 | Cain | H04N 21/44016 |
| 2018/0330112 A1* | 11/2018 | Racz | H04N 21/44012 |
| 2018/0343481 A1* | 11/2018 | Loheide | H04L 67/51 |
| 2018/0367637 A1* | 12/2018 | Balazinski | H04N 21/64322 |
| 2019/0313161 A1* | 10/2019 | Wilms | H04N 21/8456 |
| 2019/0356966 A1* | 11/2019 | Zuydervelt | H04N 21/4825 |
| 2020/0322691 A1* | 10/2020 | Hui | H04L 65/80 |
| 2021/0044972 A1* | 2/2021 | Murray | G06F 21/602 |

OTHER PUBLICATIONS

"Internet, n." OED Online, Oxford University Press, Sep. 8, 2022, www.oed.com/view/Entry/248411. Accessed Sep. 8, 2022. (Year: 2022).*

* cited by examiner

ON-DEMAND ISSUANCE PRIVATE KEYS FOR ENCRYPTED VIDEO TRANSMISSION

BACKGROUND

Live streaming is the delivery of media content (e.g., video) over the internet in which the media is presented to the viewer(s) almost simultaneously as the events depicted in the media are occurring, and is analogous to live television broadcasts of media content over the airwaves via a radiofrequency signal. Live internet streaming requires a media source (e.g., a video camera), an encoder to digitize the media content, a media publisher, and a content delivery network to distribute and deliver the content.

BRIEF DESCRIPTION OF DRAWINGS

Various embodiments in accordance with the present disclosure will be described with reference to the drawings, in which.

DETAILED DESCRIPTION

Figure 1:
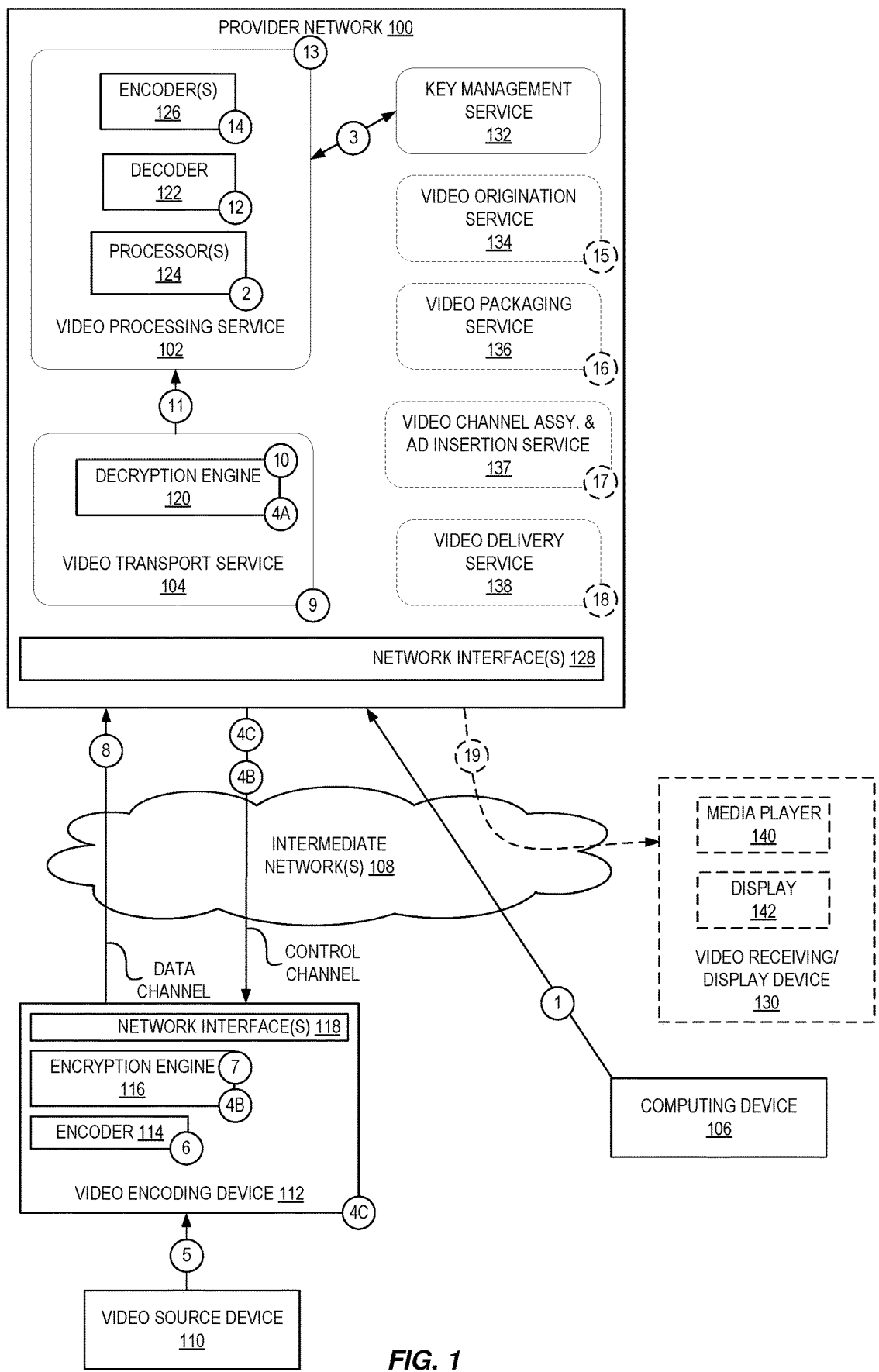
FIG. 1 is a diagram illustrating an environment for encrypted video transmission according to some embodiments.

The present disclosure relates to on-demand issuance of private keys for encrypted video transmission. In some embodiments, a video processing service generates and distributes an encryption key for use by a video encoding device when the video encoding device is to begin sending video data to the video processing service. The distribution may be made via a control plane channel of communications that is separate from a data plane channel of communications that the video encoding device uses to transmit encrypted encoded video data. The video processing service may also send the encryption key or a corresponding decryption key to a decryption engine for its use in decrypting the encrypted video data sent by the video encoding device. The generation and distribution of keys for encryption/decryption may be made upon every request from a user to begin video processing operations, allowing for efficient key rotation to provide strong data protections.

According to some embodiments, a video processing service of a provider network receives, from a computing device outside the provider network, a request to begin video processing of video data generated by a video source device outside the provider network. The video processing service determines that the video source device is associated with a video encoding device, and then obtains, from a key management service, an encryption key and a decryption key. In some embodiments, the encryption key and the decryption key are a same key, e.g., where symmetric cryptography is used. The video processing service sends instructions to the video encoding device, via a control plane channel, to establish the connection for video transmission between the video source device and the video processing service. The video processing service sends the encryption key to the video encoding device via the control plane channel, and sends the decryption key to a video transport service. The video processing service then receives video data from the video source device, via the video encoding device, and via a data plane channel.

Video that is digitally transmitted over a network (e.g., the internet) may be encrypted so that it is secure against interception and playback by unauthorized parties. One technical problem in network video transmission is how and when to generate, distribute, and/or change the encryption keys. In one approach, keys are generated at the transmit side, such as by the video encoding device under the direction of the user. For example, the video encoding device generates an encryption key for encrypting video at the transmit side (e.g., at the video encoding device), and generates a decryption key for decrypting video at the receive side (e.g., at a video transport service of a provider network). The video encoding device then transmits the decryption key to the receiving device or service (e.g., the video transport service). As another example, a user may use another device (e.g., a laptop, mobile device, server computing device, etc.) to generate a single encryption key (in the case of the use of symmetric cryptography) or a pair of encryption keys (in the case of asymmetric cryptography) and then provide the key or keys to the video encoding device and recipient.

The foregoing techniques for cryptographic key generation are prone to issues that can compromise the security of the encrypted video. For example, this user-driven approach increases the possibility that keys will be stolen, because it is not uncommon for users to reuse keys from an earlier video transmission to encrypt a new video transmission as it can be quite burdensome to repeatedly regenerate and distribute keys. Reusing keys increases the possibility that the keys can be stolen, because the keys must be stored at one or more locations during and after their use. If a storage location is compromised and the keys stored there are reused (or if the keys are obtained in another manner, such as by intercepting network traffic or reading a computer's memory), the key thief can decrypt any future video transmissions that use the stolen keys. In another example, the user-driven approach to key generation increases the possibility that the video and the keys will be sent to the wrong destination due to user error in setting up the connection for video transmission.

On-demand issuance of private keys for encrypted video transmission according to embodiments disclosed herein solve the foregoing technical problems by generating fresh cryptographic keys each time a new network connection is established for video transmission. For example, in some embodiments a video processing service in a provider network generates encryption keys, uses a bidirectional protocol for communication between the video encoding device and the provider network, and sends the encryption key from the video processing service to the video encoding device using a control plane channel of communication (e.g., using the bidirectional protocol) that is separate from a data plane channel of communications through which the video is sent. According to some embodiments, the video processing service obtains a fresh set of cryptographic keys (e.g., a single key, or a key pair such as a public key and private key) in response to receiving a request from a user computing device to begin video processing of video data generated by a video source device outside the provider network, or to establish a new network connection for video transmission from a video source device, or to restart a paused/stopped network connection for video transmission that was previously established from the video source device. Thus, a fresh set of cryptographic keys is generated for each new network connection for video transmission and/or for each restarted network connection for video transmission. The keys are less likely to be stolen, because as they are not repeatedly used they do not exist previous to the time the new network connection is established (or the network connection is restarted), and even if they are stolen, their potential use is limited to a single usage (e.g., to access a single video transmission) before they are no longer valid.

In some embodiments, the generation and distribution of the keys is managed by the video processing service in the provider network, rather than by a device or user at the video generation/transmit side. It is thus less likely that the keys will be sent to the wrong destination(s), and the case where a user purposefully or unintentionally does not generate new keys on a regular basis is eliminated. Moreover, in the event that the video is sent to the wrong destination, the unintended recipient will not be able to decrypt the video, because the unintended recipient will not have the decryption key. The video is thus more secure as compared to the prior art technique for key generation and distribution described above.

One technical aspect of some of the present embodiments that solves the technical problems described above, and that contributes to the foregoing advantages, is the bidirectional communication capability of the video encoding device. According to prior art techniques, the video encoding device operates in a largely unidirectional manner, in that it is capable of transmitting encoded video to a recipient (e.g., the video transport service in the provider network), but does not receive commands or configuration information from the provider network. By contrast, embodiments disclosed herein use a bidirectional protocol for communication between the video encoding device and the provider network. The video encoding device is thus capable of receiving the encryption key from the video processing service in the provider network, and then sending video that is encrypted using the key to the video transport service in the provider network.

Another technical aspect of some of the present embodiments that solves the technical problems described above, and that contributes to the foregoing advantages, is the communication between the video encoding device and the provider network uses two separate communication channels: A control plane channel and a data plane channel. The key is sent over the control plane channel, which is separate from the video sent over the data plane channel. Sending the key through a different channel (or "out of band" from) that used to send the video is more secure than sending the key and the video through the same channel, as the different channels may comprise completely separate connections, each of which may be further encrypted (e.g., using HTTPS (HyperText Transfer Protocol Secure) in addition to the encryption of the video.

FIG. 1 is a diagram illustrating an environment for encrypted video transmission according to some embodiments. The illustrated environment includes a provider network 100 hosting a video processing service 102 and a video transport service 104, among other services. One or more computing devices 106 (may also be referred to as client devices, user devices, or electronic devices) interact with the provider network 100 across one or more intermediate networks 108 (e.g., the internet). The provider network 100 receives video data from a video source device 110, via a video encoding device 112, both of which are outside the provider network 100.

A provider network (or "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services (may also be referred to as web services), such as a hardware virtualization service that can execute compute instances, a storage service that can store data objects, etc.

A web service is a software system designed to support interoperable machine-to-machine interaction over a network. A web service has an interface described in a machine-processable format (e.g., WSDL (Web Services Description Language)). Other systems interact with the web service in a manner prescribed by its description using, for example, SOAP (Simple Object Access Protocol) messages, which may be conveyed using HTTP (HyperText Transfer Protocol) with an XML (Extensible Markup Language) serialization in conjunction with other web-related standards.

The users (or "customers") of provider networks may use one or more user accounts that are associated with a customer account, though these terms may be used somewhat interchangeably depending upon the context of use. Users may interact with a provider network across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network that includes backend services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks often rely upon virtualization techniques. For example, virtualization technologies may be used to provide users the ability to control or use compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly use a compute resource (e.g., provided by a hardware virtualization service) hosted by the provider network to perform a variety of computing tasks. Additionally, or alternatively, a user may indirectly use a compute resource by submitting code to be executed by the provider network (e.g., via an on-demand code execution service), which in turn uses one or more compute resources to execute the code—typically without the user having any control of or knowledge of the underlying compute instance(s) involved.

With reference to FIG. 1, the video source device 110 outside the provider network 100 generates video data. In some embodiments, the video source device 110 may be a camera, and may generate the video data as it records images of the area in its field of view. The video data may comprise, for example, image frames (may also be referred to as video frames) recorded at any frame rate, including but not limited to 60 FPS (frames per second), 30 FPS, 24 FPS, 16 FPS, 8 FPS, 4 FPS, 2 FPS, 1 FPS, 0.5 FPS, 0.25 FPS, 0.125 FPS, or any other frame rate. Although only one video source device 110 is shown in FIG. 1, in some embodiments multiple video source devices 110 may send video data to the video encoding device 112. In alternative embodiments, the video source device 110 may be one or more playout devices/systems that play media content and send the media content to the video encoding device 112.

The video source device 110 is communicatively coupled to the video encoding device 112. For example, the video source device 110 and the video encoding device 112 may be communicatively coupled to one another via a wired and/or wireless connection. For example, the video source device 110 and the video encoding device 112 may be connected via a physical cable providing a serial digital interface (e.g., 3G-SDI, 6G-SDI, 12G-SDI, or the like), High-Definition Multimedia Interface (HDMI), or other well-known interface used for audio/video transmission. The video data may be continuously transmitted from the video source device 110 to the video encoding device 112 as the video data is generated. In alternative embodiments, the video data may be stored in local memory (not shown) of the video source device 110 as the video data is generated, and subsequently transmitted from the video source device 110 to the video encoding device 112.

With continued reference to FIG. 1, the video encoding device 112 receives the video data from the video source device 110. The video encoding device 112 encodes the video data using an encoder 114, and encrypts the video data using an encryption engine 116 though use of an encryption key and an encryption algorithm. The video encoding device 112 then transmits the encoded and encrypted video data, via one or more wired or wireless network interfaces 118 and over the intermediate network(s) 108, to the video transport service 104 in the provider network 100. As described in detail below, the video transport service 104 decrypts the video data using a decryption engine 120 (via use of the same encryption key or a corresponding encryption key as used by the video encoding device 112, together with a decryption algorithm corresponding to the encryption algorithm). The decrypted video data is then sent to the video processing service 102 (or may be stored at a memory location within and/or outside of the provider network 100 and accessible to the video processing service 102). The video processing service 102 receives the decrypted video data (e.g., by reading it out of the memory location) and decodes the video data using a decoder 122. The video processing service 102 subsequently encodes the video data, using one or more processors 124 and one or more encoders 126, for transmission, via one or more network interfaces 128 and the intermediate network(s) 108, to one or more video receiving/display devices 130 outside the provider network 100 or to other processing services or storage locations for subsequent use by other applications. As described in detail below, the encryption engine 116 of the video encoding device 112 encrypts the video data using an encryption key received, via the video processing service 102, from a key management service 132 of the provider network 100. Similarly, the decryption engine 120 decrypts the video data using a decryption key received, via the video processing service 102, from the key management service 132 of the provider network 100. The encryption key and decryption key may be a same key (in the case of the use of a symmetric encryption algorithm) or different (in the case of the use of an asymmetric encryption algorithm).

Figure 2:
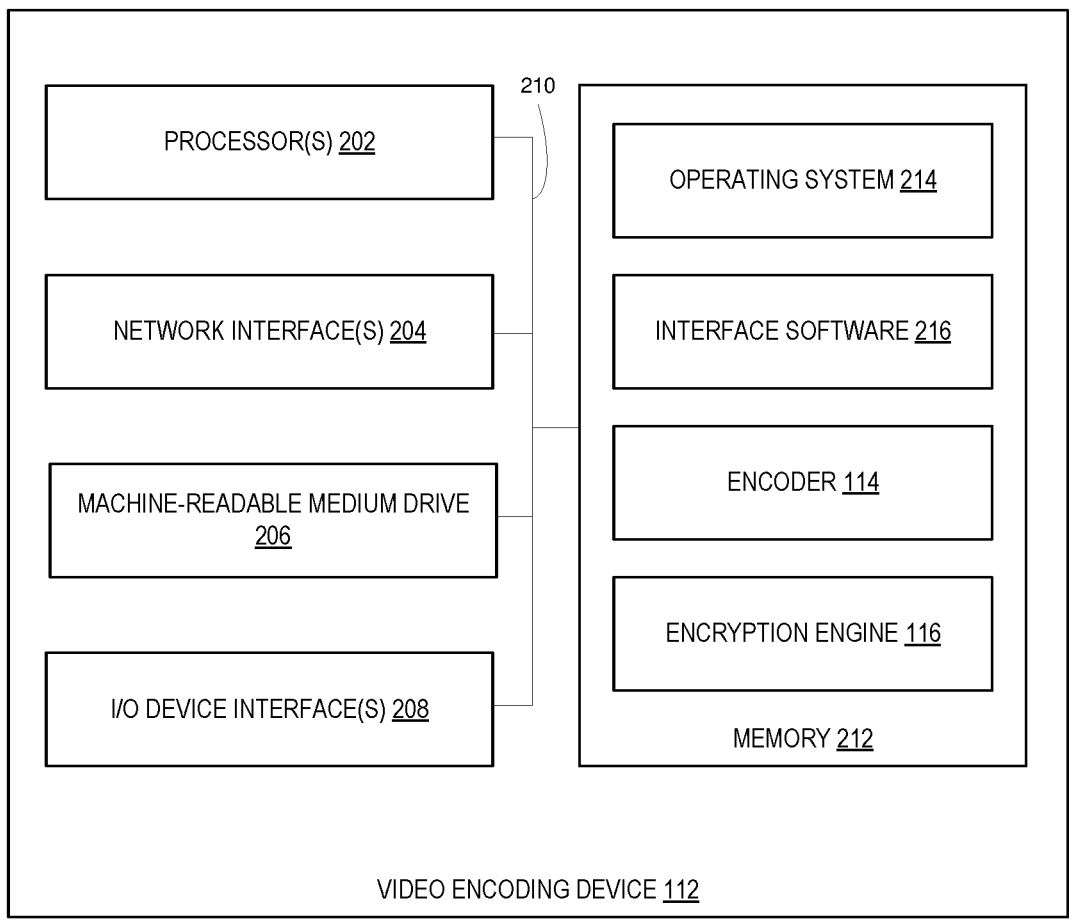
FIG. 2 is a diagram illustrating a video encoding device according to some embodiments.

FIG. 2 illustrates one embodiment of an architecture of the video encoding device 112. The general architecture of the video encoding device 112 depicted in FIG. 2 includes an arrangement of computer hardware and software components that may be used to implement aspects of the present disclosure. As illustrated, the video encoding device 112 includes one or more processors 202, one or more network interfaces 204, a machine-readable medium drive 206, and one or more input/output (I/O) device interfaces 208, all of which may communicate with one another via a communication bus 210. The components of the video encoding device 112 may be physical hardware components and/or implemented in a virtualized environment.

The network interface(s) 204 provides connectivity to the intermediate network(s) 108 and/or directly to the provider network 100 of FIG. 1, e.g., via the use of Internet Protocol (IP), and may be a wired Ethernet interface, a wireless network interface, or the like. The processor(s) 202 receives information and instructions from other computing devices and/or services of the provider network 100 directly and/or via the intermediate network(s) 108. For example, as described in detail below, the processor(s) 202 receives the encryption key and instructions from the video processing service 102. The I/O interface(s) 208 provides connectivity to one or more devices, such as, but not limited to, the computing device 106 and the video source device 110. The I/O interface(s) 208 may include, for example one or more of a 3G-SDI interface port, an HDMI interface port, etc. The processor(s) 202 also communicate to and from a memory 212. In some embodiments, the video encoding device 112 may include more (or fewer) components than those shown in FIG. 2.

The memory 212 stores computer program instructions and other information (not shown) that the processor(s) 202 executes to implement one or more of the present embodiments. The memory 212 generally includes RAM, ROM, and/or other persistent or non-transitory memory. The memory 212 may store an operating system 214 that provides computer program instructions for use by the processor(s) 202 in the general administration and operation of the video encoding device 112. The memory 212 may further store interface software 216 for receiving and processing the video data from the video source device 110.

The memory 212 further includes the encoder 114 for processing the video data and generating encoded video data in accordance with a specified bitrate and/or format. In general, video encoders compress (reduce the size of) video data so that it is easier to transmit over a network. Video encoders use video compression algorithms, or codecs (e.g., H.264/AVC, H.265/HEVC), that reduce the size of the raw video data generated by the camera. For example, encoding compresses a video file (e.g., input frame(s)) into a plurality of compressed frames. Compressed frames may include, for example, intra-coded picture frames (I-frames, e.g., with each I-frame as a complete image), and inter-coded picture frames. Inter-coded picture frames may include predicted picture frames (P-frames or delta-frames, e.g., with each P-frame having only the changes in the image from the previous frame), and/or bidirectional predicted picture frames (B-frames, e.g., that further save space (e.g., bits) by using differences between the current frame and the preceding and/or following frames to specify its content). In some embodiments, each single I-frame is associated with one or more inter-coded frames (e.g., P-frames and/or B-frames), for example, as a group of pictures (GOP).

The memory further includes the encryption engine 116 for encrypting the encoded video data in accordance with an encryption specification. In general, encryption is a way of scrambling data so that only authorized parties can understand the information. In technical terms, it is the process of converting human-readable plaintext to incomprehensible text, also known as ciphertext. In simpler terms, encryption takes readable data and alters it so that it appears random. Encryption requires the use of a cryptographic key. A cryptographic key is a string of characters used within an encryption algorithm for altering data so that it appears random. Like a physical key, it locks (encrypts) data so that only someone with the right key can unlock (decrypt) it. The original data is known as the plaintext, and the data after the key encrypts it is known as the ciphertext. Although encrypted data appears random, encryption proceeds in a logical, predictable way, allowing a party that receives the encrypted data and possesses the right key to decrypt the data, turning it back into plaintext. Truly secure encryption uses keys complex enough that a third party is highly unlikely to decrypt or break the ciphertext by guessing the key. Data can be encrypted at rest, when it is stored, or in transit, while it is being transmitted somewhere else.

In some embodiments, the encryption engine 116 encrypts the encoded video data in accordance with the AES-128 (Advanced Encryption Standard 128-bit key length) encryption specification. AES is a symmetric block cipher that may be implemented in software and/or hardware in the present embodiments. AES includes three block ciphers: AES-128, AES-192, and AES-256. AES-128 uses a 128-bit key length to encrypt and decrypt a block of messages, while AES-192 uses a 192-bit key length, and AES-256 uses a 256-bit key length to encrypt and decrypt messages. Each cipher encrypts and decrypts data in blocks of 128 bits using cryptographic keys of 128, 192, and 256 bits, respectively. AES is a symmetric-key, also known as secret-key or private-key, cipher that uses the same key for encrypting and decrypting. The sender and the receiver thus must both know—and use—the same secret/private key. Although the foregoing description focuses on the AES encryption specification, any encryption specification or standard is within the scope of the present embodiments, including but not limited to other symmetric-key specifications (e.g., Blowfish, DES (Data Encryption Standard), IDEA (International Data Encryption Algorithm), etc.) and asymmetric-key (also known as public-key) specifications (e.g., Diffie-Hellman key exchange protocol, DSS (Digital Signature Standard), ElGamal, etc.).

Asymmetric-key cryptography is a cryptographic system that uses pairs of keys: public keys (which may be known to others), and private keys (which may never be known by anyone except the owner(s)). The generation of such key pairs depends on cryptographic algorithms that are based on mathematical problems called one-way functions. Effective security requires keeping the private key private; the public key can be openly distributed without compromising security. In such a system, any person can encrypt a message using the intended receiver's public key, but that encrypted message can only be decrypted with the receiver's private key. This allows, for instance, a server program to generate a cryptographic key intended for a suitable symmetric-key cryptography, then to use a client's openly-shared public key to encrypt that newly generated symmetric key. The server can then send this encrypted symmetric key over an insecure channel to the client; only the client can decrypt it using the client's private key (which pairs with the public key used by the server to encrypt the message). With the client and server both having the same symmetric key, they can safely use symmetric key encryption, which is typically much faster than asymmetric key encryption, to communicate over otherwise-insecure channels. This scheme has the advantage of not having to manually pre-share symmetric keys (a fundamentally difficult problem), while gaining the higher data throughput advantage of symmetric-key cryptography.

With reference to FIG. 1, the video transport service 104 and the video processing service 102 enable users to easily distribute video, such as live video, to potentially many different clients. For distributing live video, the video source device 110 may generate continuous video, where the video data is captured (or generated) at the video source device 110 and continually sent (e.g., via the intermediate network(s) 108 such as the internet) to the video transport service 104 and the video processing service 102 for processing—e.g., into different formats, resolutions, frame rates, etc. For example, the decryption engine 120 of the video transport service 104 may decrypt the encrypted video data received from the video encoding device 112, and the decoder 122 of the video processing service 102 may decode the video data. The decoder 122 may decode the video data into a common format that can be re-encoded by the encoder 126 of the video processing service 102 into one or more other formats, resolutions, etc. (e.g., more suitable for playback by the video receiving/display device 130). In the illustrated embodiment, the video processing service 102 and the video transport service 104 are shown using separate boxes, and in some embodiments the video processing service 102 and the video transport service 104 may comprise separate services within the provider network 100. In alternative embodiments, however, the video processing service 102 and the video transport service 104 may be implemented together as a combined video processing/transport service. Also in alternative embodiments, the decoder 122 may be a component of the video transport service 104 rather than the video processing service 102.

Encoded video data generated by the video processing service 102 may optionally be sent to a video origination service 134 (e.g., AWS Elemental MediaStore), a video packaging service 136 (e.g., AWS Elemental MediaPackage), and/or a video channel assembly and personalized ad insertion service 137 (e.g., AWS Elemental MediaTailor) that prepare and protect video for delivery over the internet by creating video formatted to play on connected televisions, mobile phones, computers, tablets, game consoles, etc., optionally implementing popular media features for viewers (e.g., start-over, pause, rewind), protecting content using Digital Rights Management (DRM), and/or inserting personalized advertising. The packaged video may then be optionally served, via a video delivery service 138 (e.g., Amazon CloudFront) of the provider network 100, to one or more of the video receiving/display devices 130 (may also be referred to as client devices). The video origination service 134 may include one or more processors (not shown) executing machine-readable instructions stored in memory (not shown) to perform the functions of the video origination service 134 described herein. Similarly, the video packaging service 136 may include one or more processors (not shown) executing machine-readable instructions stored in memory (not shown) to perform the functions of the video packaging service 136 described herein. Similarly, the video channel assembly and personalized ad insertion service 137 may include one or more processors (not shown) executing machine-readable instructions stored in memory (not shown) to perform the functions of the video channel assembly and personalized ad insertion service 137 described herein.

In accordance with various embodiments, for purposes of illustration, the video delivery service 138 includes one or more servers for receiving video data from one or more sources (e.g., the video source device 110) and processing the video data to make available a set of received encoded bitrate segments, such as via the video channel assembly and personalized ad insertion service 137, the video packaging service 136, and the video origination service 134. The components of the video delivery service 138 may provide the encoded content to one or more separate standalone services, such as a content delivery network (CDN) service (not shown), for subsequent transmission to user devices. In other embodiments, the video delivery service 138 may be integrated or form a part of a CDN service environment. Accordingly, the term video delivery service 138 may be generally variable and is not limited to any particular implementation. In one example, the video delivery service 138 may be a content delivery network with multiple, geographically dispersed locations to facilitate the timely delivery of media data to users (and, in the case of streaming media to users, reduce the network distance to reduce the likelihood of transmission problems). The video delivery service 138 may include one or more processors (not shown) executing machine-readable instructions stored in memory (not shown) to perform the functions of the video delivery service 138 described herein.

With reference to FIG. 1, the provider network 100 further includes the key management service 132 (e.g., AWS Key management service (KMS)). In general, a key management service manages cryptographic keys, including the generation, exchange, storage, use, destruction, and replacement of keys. A key management service may include cryptographic protocol design, key servers, user procedures, and other relevant protocols. The key management service 132 of the present embodiments may include one or more processors (not shown) executing machine-readable instructions stored in memory (not shown) to perform the functions of the key management service 132 described herein.

With continued reference to FIG. 1, the video receiving/display device 130 includes a media player 140 (e.g., to play media content such as video), and a display 142 to show the images of the video (e.g., from video data files). The video receiving/display device 130 may further include local memory (not shown) to store the video data. For example, the local memory may buffer the video data as it is received from the provider network 100. The video receiving/display device 130 is one example of the computing device 900 illustrated in FIG. 9, which is described in detail below.

As described above, the video encoding device 112 receives video data from the video source device 110, encodes and encrypts the video data, and transmits the encoded and encrypted video data over the intermediate network(s) 108 to the video transport service 104 in the provider network 100. The video transport service 104 decrypts the video data, and stores the decrypted video data at a memory location within and/or outside of the provider network 100. The video processing service 102 receives the decrypted video data (e.g., by reading it out of the memory location) and decodes the decrypted video data. The video processing service 102 subsequently encodes the video data for transmission to one or more video receiving/display devices 130 outside the provider network 100. This process is described in greater detail below.

With reference to FIG. 1, at circle "1" the computing device 106 transmits a request to the video processing service 102, over the intermediate network(s) 108 and via the network interface(s) 128 of the provider network 100.

The request is to begin video processing of video data generated by a video source device outside the provider network, or to initiate transmission of video data between the video source device 110, which is outside the provider network 100, and the video processing service 102.

For example, in some embodiments a user using a computing device 106 may interact with the video processing service 102 as shown at circle "1" by sending a request to start a media channel A media channel may generally refer to a processing configuration in which a video processing service 102 (perhaps along with one or more of the video transport service 104, video origination service 134, video packaging service 136, etc.) is to ingest and transcode (decode and encode) source content from a set of inputs, and package the new content into a set of outputs. For example, a user may create and configure a channel by providing the media processing service with details that instruct the channel how to perform this processing, for example, by providing a name for a channel, identifying and describing a set of inputs that the channel will use (e.g., an input codec, input resolution, maximum input bitrate, input device(s) identifiers or network addresses, and/or the like), identifying a set of output groups for the channel (e.g., an identification of an output destination, media codecs or formats, etc.), identifying optional media processing to be performed (e.g., processing caption information), etc. With a configured channel, the user (or the video processing service 102, such as through use of user-provided information identifying the encoding device) may configure the video encoding device 112 to communicate with the video processing service 102 (or related service, such as the video transport service 104). The user may then, via use of an application (e.g., a web-based console, a special-purpose application, or similar) cause the computing device 106 to send a request to start the channel and thus the transcoding/packaging operations associated with the channel. This request may include an identifier of the channel (e.g., its user-provided name) or similar.

At circle "2," the video processing service 102 (e.g., the processor(s) 124 of the video processing service 102) receives the request and determines that the video source device 110 is associated with the video encoding device 112. In some embodiments, this determination may be made based on the channel configuration, which in some embodiments may be provided by the user as described above. For example, the channel configuration may identify and describe a set of inputs that the channel will use, including an identification and/or description of an input device.

At circle "3," the video processing service 102 obtains, from the key management service 132, a set of one or multiple cryptographic keys to serve as an encryption key and a decryption key. In particular, the video processing service 102 requests the set of cryptographic keys from the key management service 132, and, in response, the key management service 132 generates a new set of cryptographic keys and returns the cryptographic keys to the video processing service 102. The video processing service 102 then distributes the cryptographic keys, sending the decryption key to the video transport service 104 at circle "4A," and sending the encryption key to the video encoding device 112 at circle "4B." At circle "4C," the video processing service 102 sends instructions to the video encoding device 112 to establish the connection (e.g., one or more messages indicating a command to begin transmitting video data) for video transmission between the video source device 110 and the video processing service 102. In some embodiments, the video processing service 102 may send the encryption key and the instructions to the video encoding device 112 at the same time, while in other embodiments the encryption key and the instructions may be sent separately. In some embodiments, the instructions sent by the video processing service 102 to the video encoding device 112 may include a network address (e.g., an IP address) of the destination (e.g., the video transport service 104) for the video data and/or information about one or more protocols to use for the transmission of the video data.

In some embodiments, the video processing service 102 sends the encryption key and the instructions to the video encoding device 112 via a control plane channel (may also be referred to as a control channel) that is separate from a data plane channel (may also be referred to as a data channel) through which the video data is sent (at circle "8" described below). As described above, the data plane represents the movement of user-specific data (through or involving the provider network 100), and the control plane represents the movement of control signals (through or involving the provider network 100). Advantageously, transmitting the encryption key via the control plane channel, separate from the video data on the data plane channel, enhances the security of the present embodiments, because the encryption key is less susceptible to being stolen through a man-in-the-middle attack, the channel may use different network protocols and/or encryption schemes, may involve different network paths, etc.

Also in some embodiments, the video processing service 102 sends the encryption key and the instructions to the video encoding device 112 using a bidirectional communication protocol. For example, the bidirectional communication protocol may comprise MQTT (Message Queuing Telemetry Transport). MQTT is an open OASIS and ISO standard (ISO/IEC 20922) lightweight, publish-subscribe network protocol that transports messages between devices and may run over TCP/IP. Using a bidirectional protocol for communication between the video encoding device 112 and the provider network 100 according to the present embodiments advantageously renders the video encoding device 112 capable of receiving instructions and the encryption key from the video processing service 102 in the provider network 100, and subsequently sending encrypted video to the video transport service 104 in the provider network 100. This is in contrast to prior art techniques in which the video encoding device 112 is unidirectional; it can send video data to the provider network, but it cannot receive instructions or data from the provider network. In some embodiments, the bidirectional communication protocol may be referred to as an IoT (Internet of Things) protocol or a lightweight IoT protocol. Other examples of bidirectional protocols that may be used for communications between the video processing service 102 and the video encoding device 112 include, without limitation, Transport Layer Security (TLS), Secure Sockets Layer (SSL), Advanced Message Queuing Protocol (AMQP), or any other protocol that is capable of supporting encrypted and reliable communications.

With continued reference to FIG. 1, at circle "5" the video encoding device 112 receives video data from the video source device 110. The video encoding device 112 encodes the video data, using the encoder 114, at circle "6," and encrypts the encoded video data, using the encryption engine 116 and provided key, at circle "7." At circle "8," the video encoding device 112 transmits the encoded and encrypted video data to the video transport service 104, over the intermediate network(s) 108 and via the network interface(s) 118 of the video encoding device 112. The video encoding device 112 sends the video data to the video processing service 102 via the data channel, which is separate from the control channel through which the encryption key and the instructions are sent (as described above).

At circle "9," the video transport service 104 receives the encoded and encrypted video data from the video encoding device 112. The video transport service 104 decrypts the encoded video data, using the decryption engine 120 and provided key, at circle "10," and sends the decrypted video data to the video processing service 102 at circle "11." The video processing service 102 receives the decrypted and encoded video data from the video transport service 104 at circle "12," and decodes the video data (e.g., video frames), using the decoder 122, at circle "13." In alternative embodiments, the video transport service 104 stores, at circle "11," the decrypted and encoded video data to memory (not shown) accessible to both the video transport service 104 and the video processing service 102 and, at circle "12," the video processing service 102 reads out the decrypted and encoded video data from the memory and decodes the video data (e.g., video frames), using the decoder 122, at circle "13." At circle "14," the video processing service 102 encodes the video data into one or more formats (e.g., one or more bitrates of one or more encodings), using one or more encoders, and the encoded video data is transmitted to the at least one video receiving/display device 130 at circle "19" (optionally via the video origination service 134 at circle "15," the video packaging service 136 at circle "16," the video channel assembly and personalized ad insertion service 137 at circle "17," and the video delivery service 138 at circle "18").

As described above, a good cryptographic key is both complex and fresh. To ensure that video data is always processed with a fresh set of cryptographic keys, the video processing service 102 according to the present embodiments obtains new cryptographic keys every time a new connection (e.g., a channel) for video transmission from a video source outside the provider network 100 is established and/or every time the network connection is restarted. The keys are sent to both the video encoding device 112 where the video data is encrypted, and the video transport service 104 that receives the video data and performs the decryption.

Figure 3:
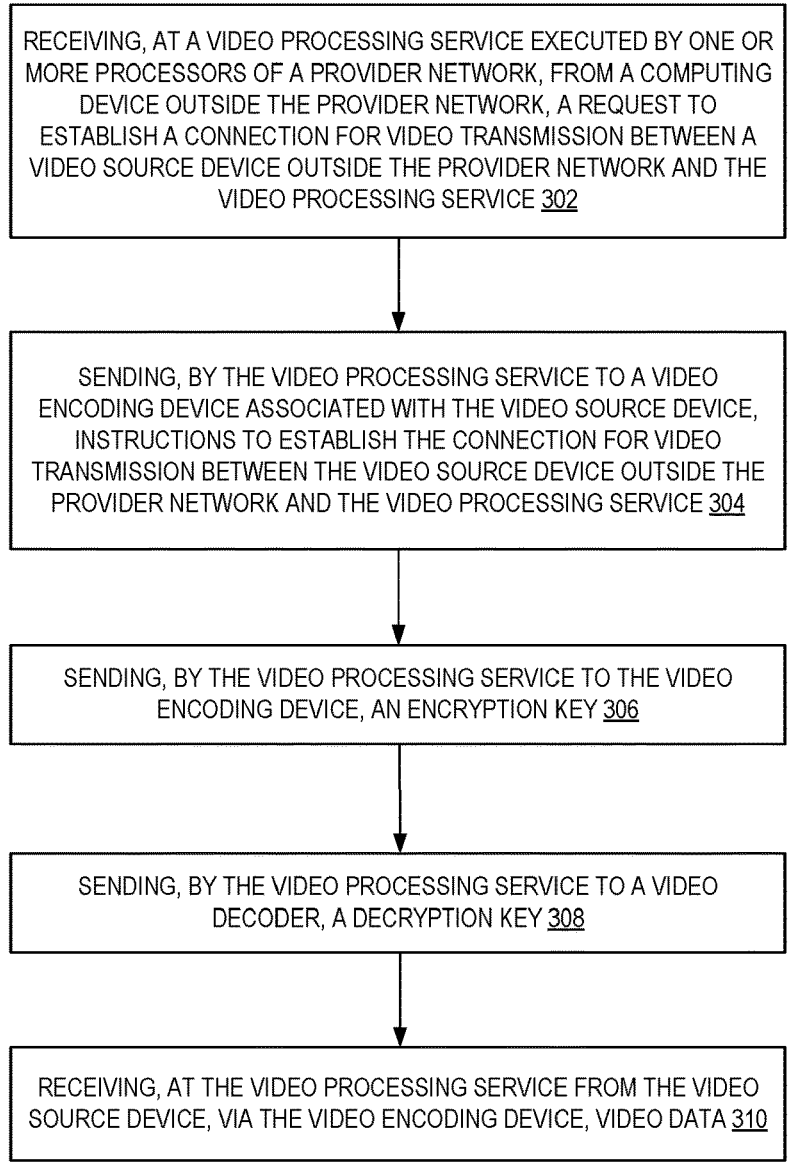
FIG. 3 is a flow diagram illustrating operations of a method for on-demand issuance of private keys for encrypted video transmission according to some embodiments.

FIG. 3 is a flow diagram illustrating operations 300 of a method for on-demand issuance of private keys for encrypted video transmission according to some embodiments. Some or all of the operations 300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors, by hardware, or by combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by the video processing service 102 of the other figures.

The operations 300 include, at block 302, receiving, at a video processing service 102 executed by one or more processors 124 of a provider network 100, from a computing device 106 outside the provider network 100, a request to begin video processing of video data generated by a video source device outside the provider network, or to initiate transmission of video data between a video source device 110 outside the provider network 100 and the video processing service 102. For example, the operations at block 302 may include the operations shown in FIG. 1 and described above with respect to circle "1."

The operations 300 further include, at block 304, sending, by the video processing service 102 to a video encoding device 112 associated with the video source device 110, instructions (e.g., one or more messages indicating a command to begin transmitting video data) to establish the connection (e.g., a channel) for video transmission between the video source device 110 outside the provider network 100 and the video processing service 102. For example, the operations at block 304 may include the operations shown in FIG. 1 and described above with respect to circle "4C."

The operations 300 further include, at block 306, sending, by the video processing service 102 to the video encoding device 112, an encryption key. For example, the operations at block 306 may include the operations shown in FIG. 1 and described above with respect to circle "4B."

The operations 300 further include, at block 308, sending, by the video processing service 102 to a video decryption engine 120, a decryption key. For example, the operations at block 308 may include the operations shown in FIG. 1 and described above with respect to circle "4A."

The operations 300 further include, at block 310, receiving, at the video processing service 102 from the video source device 110, via the video encoding device 112, video data. For example, the operations at block 310 may include the operations shown in FIG. 1 and described above with respect to circles "5," "8," and "13."

In some embodiments, the transmission of video data from the video source device 110 to the video processing service 102 may be stopped and restarted. For example, the computing device 106 may send a request (e.g., from a user of the computing device 106) to stop the transmission of the video data, and the computing device 106 may subsequently send a request (e.g., from a user of the computing device 106) to restart the transmission of the video data from the video source device 110 to the video processing service 102. When the transmission of the video data is to be restarted, the video processing service 102 may obtain a new set of cryptographic keys (e.g., from the key management service 132) and send the new keys to the video transport service 104 and the video encoding device 112. For example, the steps described above with respect to circles "3," "4A," "4B," and "4C" of FIG. 1 may be repeated when the request(s) to stop and restart the transmission of video data from the video source device 110 to the video processing service 102 is received from the computing device 106. In this manner, the security of the video data is enhanced, because the keys used in previous instantiations of the video channel are not reused, and are thus less susceptible to being stolen or intercepted.

Figure 4:
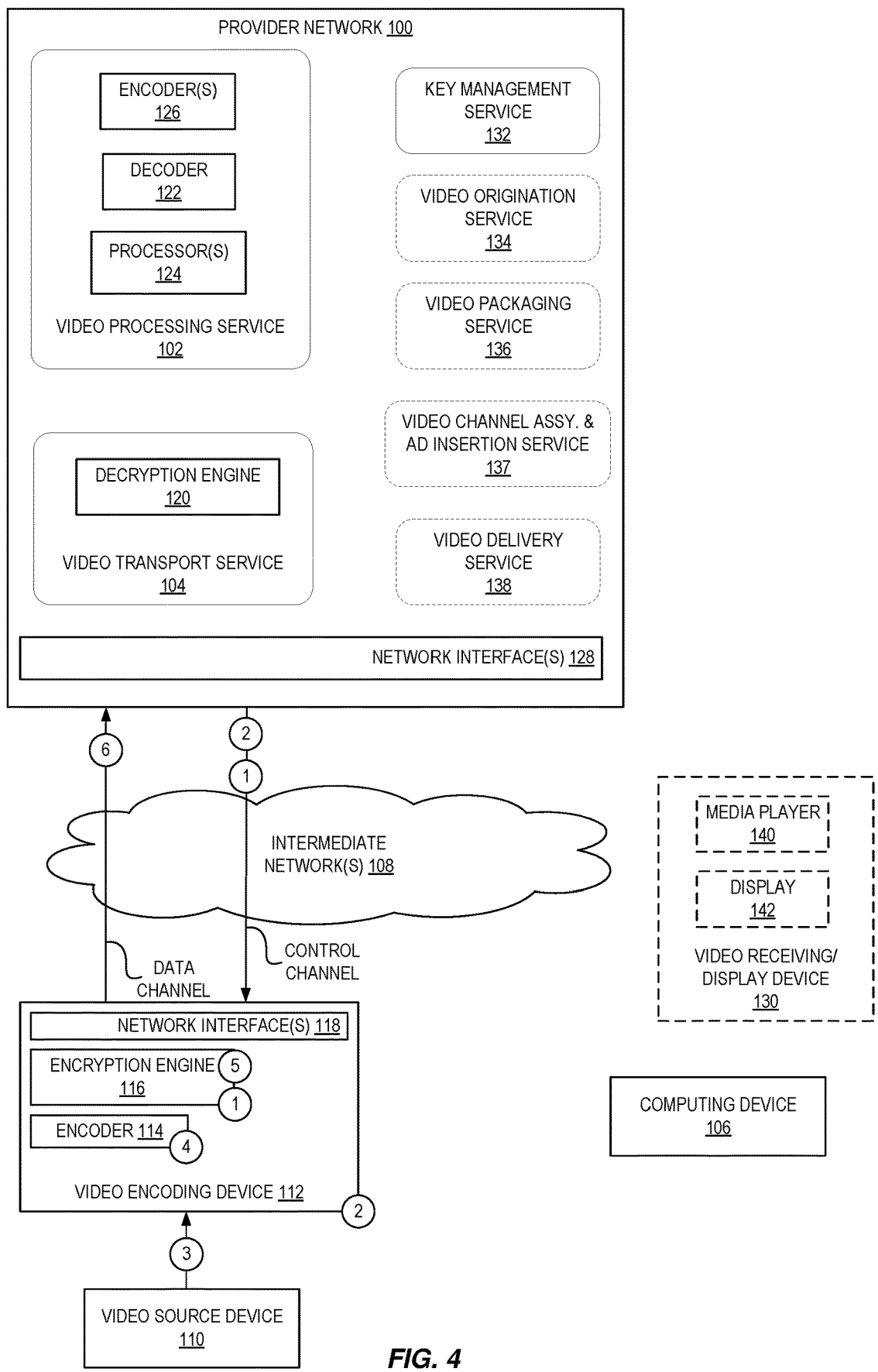
FIG. 4 is a diagram illustrating an environment for encrypted video transmission according to some embodiments.

FIG. 4 is a diagram illustrating an environment for encrypted video transmission according to some embodiments. FIG. 4 includes the same components as FIG. 1, but illustrates a process from the perspective of the video encoding device 112 according to some embodiments. At circle "1," the video encoding device 112 receives the encryption key from the video processing service 102 via the control channel. At circle "2," the video encoding device 112 receives the instructions, from the video processing service 102 via the control channel, to establish the connection (e.g., a channel) for video transmission between the video source device 110 and the video processing service 102. At circle "3," the video encoding device 112 receives the video data from the video source device 110.

The video encoding device 112 encodes the video data, using the encoder, at circle "4," and encrypts the encoded video data, using the encryption engine 116, at circle "5." At circle "6," the video encoding device 112 transmits the encoded and encrypted video data to the video transport service 104, over the intermediate network(s) 108 and via the network interface(s) 118 of the video encoding device 112. The video encoding device 112 sends the video data to the video processing service 102 via the data channel, which is separate from the control channel through which the encryption key and the instructions are received (as described above).

Figure 5:
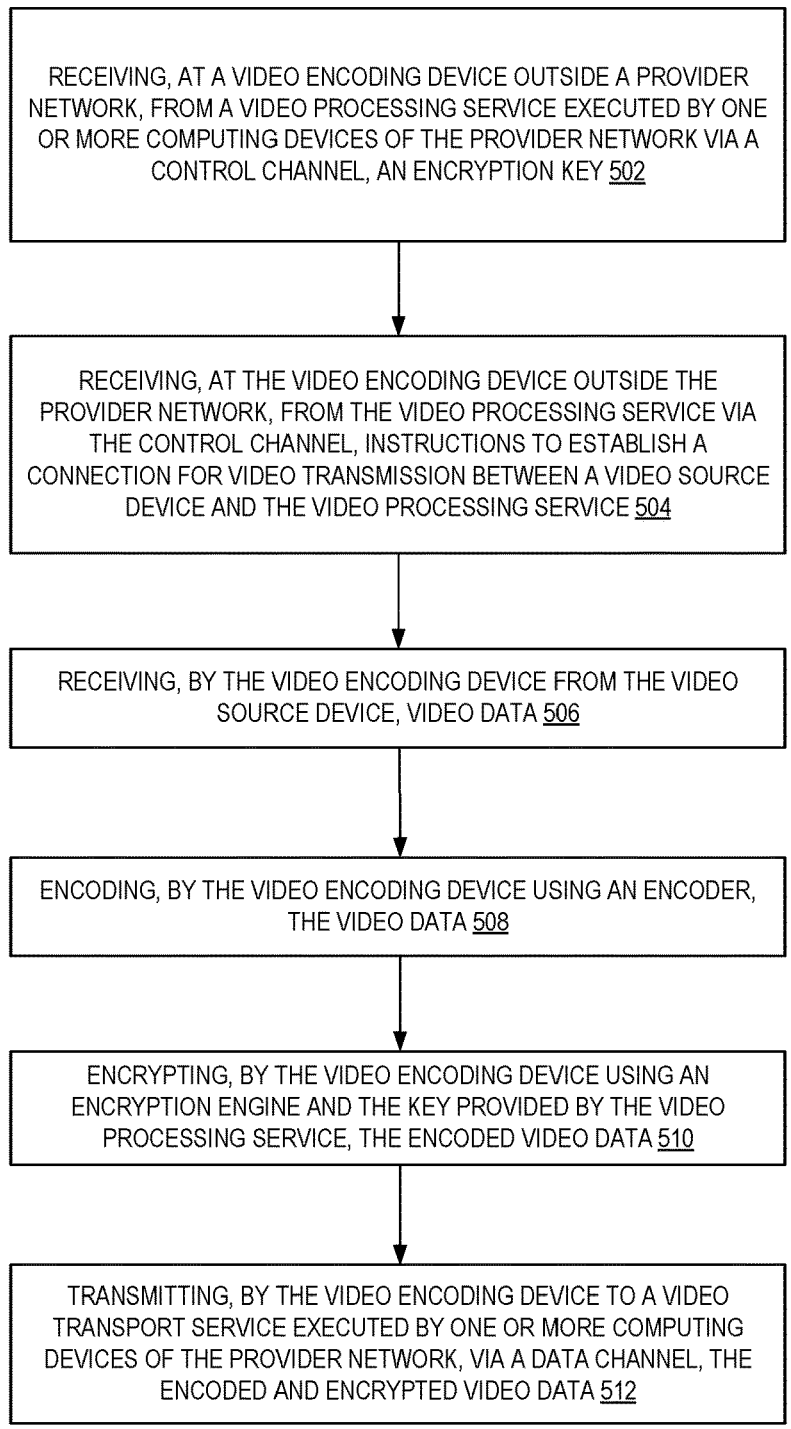
FIG. 5 is a flow diagram illustrating operations of a method for on-demand issuance of private keys for encrypted video transmission according to some embodiments.

FIG. 5 is a flow diagram illustrating operations of a method for on-demand issuance of private keys for encrypted video transmission according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors, by hardware, or by combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the video encoding device 112 of the other figures.

The operations 500 include, at block 502, receiving, at a video encoding device 112 outside a provider network 100, from a video processing service 102 executed by one or more processors 124 of the provider network 100 via a control channel, an encryption key. For example, the operations at block 502 may include the operations shown in FIG. 4 and described above with respect to circle "1."

The operations 500 further include, at block 504, receiving, at a video encoding device 112 outside a provider network 100, from the video processing service 102 via the control channel, instructions (e.g., one or more messages indicating a command to begin transmitting video data) to establish a connection (e.g., a channel) for video transmission between a video source device 110 and the video processing service 102. For example, the operations at block 504 may include the operations shown in FIG. 4 and described above with respect to circle "2."

The operations 500 further include, at block 506, receiving, by the video encoding device 112 from the video source device 110, video data. For example, the operations at block 506 may include the operations shown in FIG. 4 and described above with respect to circle "3."

The operations 500 further include, at block 508, encoding, by the video encoding device 112 using an encoder 114, the video data. For example, the operations at block 508 may include the operations shown in FIG. 4 and described above with respect to circle "4."

The operations 500 further include, at block 510, encrypting, by the video encoding device 112 using an encryption engine 116, the encoded video data. For example, the operations at block 510 may include the operations shown in FIG. 4 and described above with respect to circle "5."

The operations 500 further include, at block 512, transmitting, by the video encoding device 112 to a video transport service 104 executed by one or more processors of the provider network 100, via a data channel, the encoded and encrypted video data. For example, the operations at block 512 may include the operations shown in FIG. 4 and described above with respect to circle "6."

Figure 6:
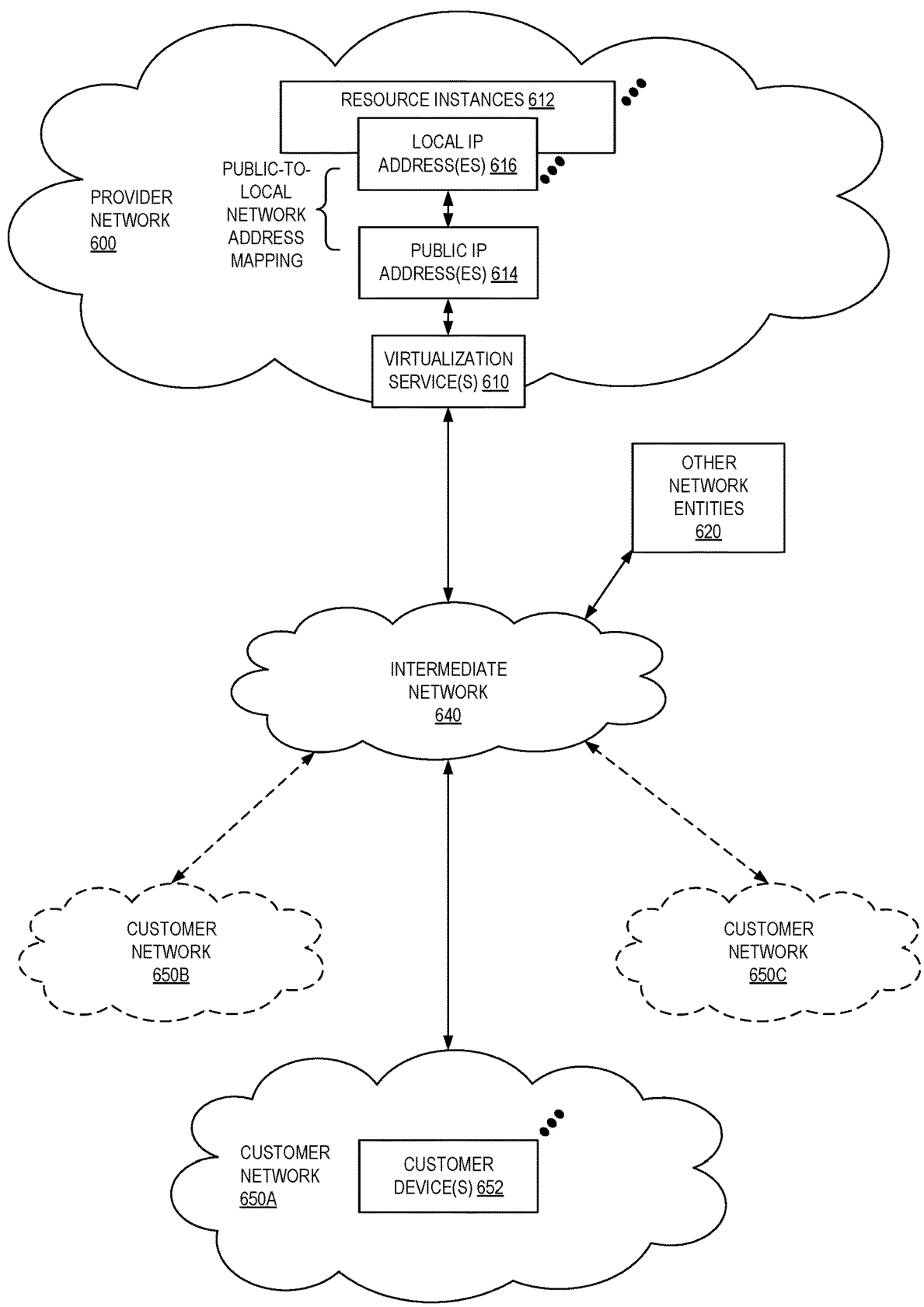
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
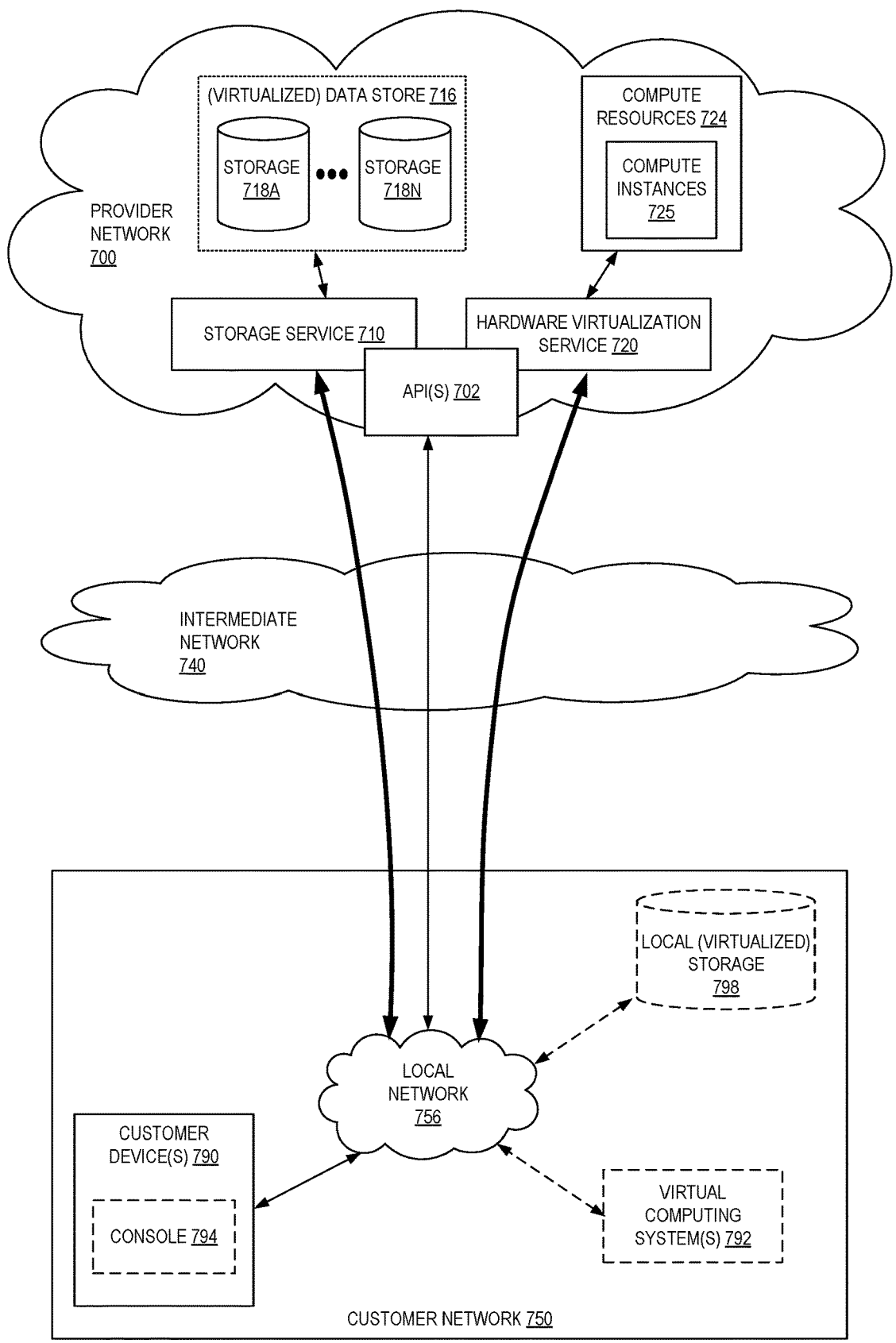
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public internet destinations, and from public internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
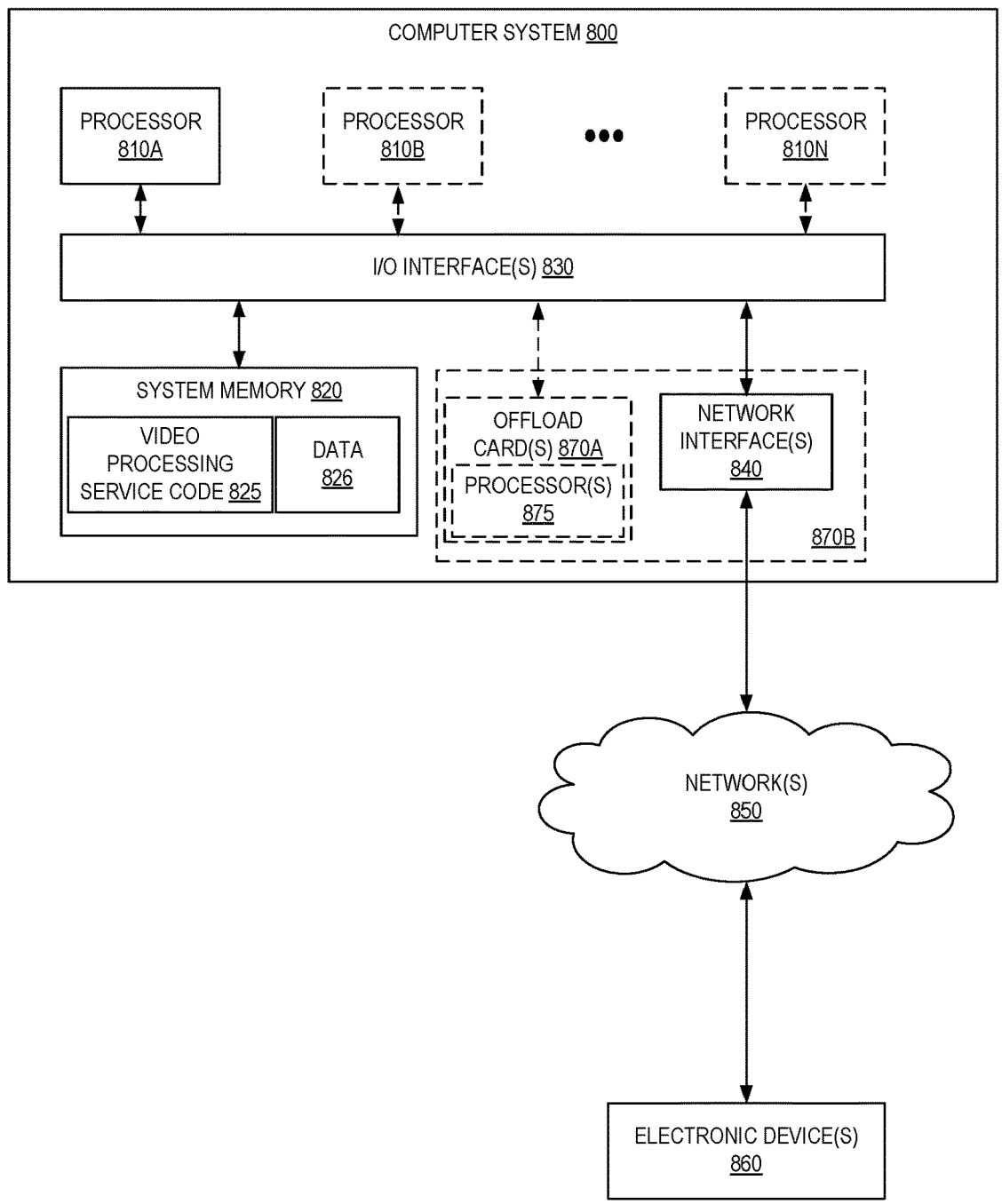
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as video processing service code 825 (e.g., executable to implement, in whole or in part, the video processing service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
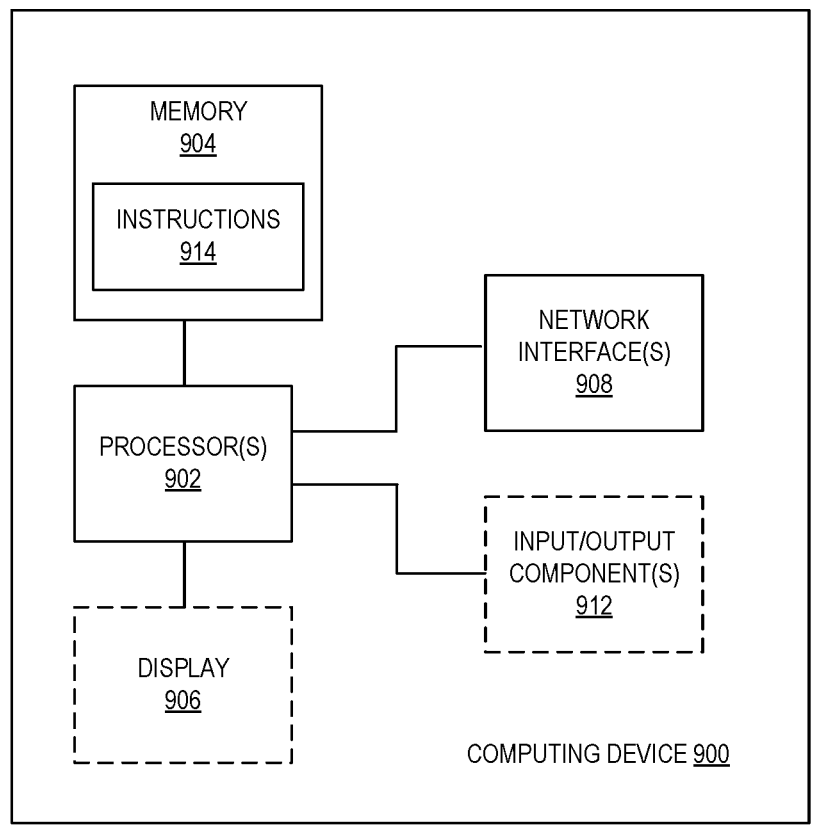
FIG. 9 illustrates a logical arrangement of a set of general components of an example computing device that can be used in accordance with various embodiments.

FIG. 9 illustrates a logical arrangement of a set of general components of an example computing device 900, such as the computing device 106 of FIG. 1, etc. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (e.g., instructions 914) and/or data, and a set of one or more wired or wireless network interfaces 908 allowing the electronic device to transmit data to and receive data from other computing devices, typically across one or more networks (e.g., Local Area Networks (LANs), the internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 914) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and use a microphone, camera, sensor, etc., such that a user can control the device without having to be in physical contact with the device.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the internet, an intranet, an extranet, a public switched telephone network (PSTN), an infrared network, a wireless network, and any combination thereof.

In embodiments using a web server, the web server can run any of a variety of server or mid-tier applications, including HTTP (HyperText Transfer Protocol) servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method, comprising:
receiving, at a video processing service executed by a first one or more processors of a provider network, from a computing device outside the provider network, a request to initiate transmission of video data between a video source device outside the provider network and the video processing service;
determining, by the first one or more processors of the video processing service, that the video source device is associated with a video encoding device;
obtaining, by the video processing service from a key management service executed by a second one or more processors of the provider network, a set of cryptographic keys including an encryption key and a decryption key;
sending, by the video processing service to the video encoding device via a control plane channel, instructions to establish the connection for video transmission between the video source device outside the provider network and the video processing service;
sending, by the video processing service to the video encoding device via the control plane channel, the encryption key;
sending, by the video processing service to a video transport service executed by a third one or more processors of the provider network, the decryption key;
receiving, at the video processing service from the video source device, via the video encoding device, and via a data plane channel, video data;
receiving, at the video processing service, from the computing device, a request to restart video processing of new video data generated by the video source device;
sending, by the video processing service to the video encoding device via the control plane channel, one or more messages indicating a command to restart video transmission to the video processing service, wherein the message includes a new encryption key to be used by the video encoding device for encrypting the new video data;
sending, by the video processing service to the video transport service, a new decryption key to be used by the video transport service to decrypt the new video data; and
receiving, at the video processing service from the video encoding device via the data plane channel, the new video data.

2. The computer-implemented method of claim 1, wherein sending the encryption key comprises using a bidirectional protocol.

3. The computer-implemented method of claim 1, wherein obtaining the set of cryptographic keys from the key management service comprises the video processing service requesting the set of cryptographic keys from the key management service, and, in response, the key management service generating a new set of cryptographic keys and returning the new set of cryptographic keys to the video processing service.

4. A computer-implemented method, comprising:
receiving, at a video processing service of a provider network, from a computing device outside the provider network, a request to begin video processing of video data generated by a video source device outside the provider network;
sending, by the video processing service to a video encoding device associated with the video source device via a first communications channel, one or more messages indicating a command to begin video transmission to the video processing service, wherein the message includes an encryption key to be used by the video encoding device for encrypting the video data;
sending, by the video processing service to a video decryption engine within the provider network, a decryption key to be used by the video decryption engine to decrypt the video data;
receiving, at the video processing service from the video encoding device via a second communications channel, the video data;
receiving, at the video processing service, from the computing device, a request to restart video processing of new video data generated by the video source device;
sending, by the video processing service to the video encoding device via the first communications channel, one or more messages indicating a command to restart video transmission to the video processing service, wherein the message includes a new encryption key to be used by the video encoding device for encrypting the new video data;

sending, by the video processing service to the video decryption engine, a new decryption key to be used by the video decryption engine to decrypt the new video data; and receiving, at the video processing service from the video encoding device via the second communications channel, the new video data.

5. The computer-implemented method of claim 4, further comprising determining, by the video processing service, that the video source device is associated with the video encoding device.

6. The computer-implemented method of claim 4, further comprising obtaining, by the video processing service from a key management service, the encryption key and the decryption key.

7. The computer-implemented method of claim 6, wherein the key management service is executed by one or more computing devices of the provider network.

8. The computer-implemented method of claim 6, wherein obtaining the encryption key and the decryption key from the key management service comprises the video processing service requesting the encryption key and the decryption key from the key management service, and, in response, the key management service generating a new encryption key and a new decryption key and returning the new encryption key and the new decryption key to the video processing service.

9. The computer-implemented method of claim 6, wherein the encryption key and the decryption key are generated by the key management service using a symmetric encryption algorithm.

10. The computer-implemented method of claim 4, wherein sending the encryption key comprises using a bidirectional protocol.

11. The computer-implemented method of claim 10, wherein the bidirectional protocol comprises MQTT (Message Queuing Telemetry Transport).

12. The computer-implemented method of claim 4, wherein sending the encryption key comprises using a lightweight IoT (Internet of Things) protocol.

13. The computer-implemented method of claim 4, further comprising receiving, by a video delivery service of the provider network, the video data via one ore more of a video channel assembly and personalized ad insertion service of the provider network, a video packaging service of the provider network, or a video origination service of the provider network.

14. The computer-implemented method of claim 4, wherein the video processing service and the video transport service are implemented together as a combined video processing/transport service in the provider network.

15. A system, comprising:
one or more electronic devices to implement a video processing service in a multi-tenant provider network, the video processing service including instructions that, upon execution by one or more processors of the video processing service, cause the video processing service to:
receive, from a computing device outside the provider network, a request to begin video processing of video data generated by a video source device outside the provider network;
send, to a video encoding device associated with the video source device via a first communications channel, one or more messages indicating a command to begin video transmission to the video processing service, wherein the message includes an encryption key to be used by the video encoding device for encrypting the video data;
send, to a video decryption engine within the provider network, a decryption key to be used by the video decryption engine to decrypt the video data;
receive, from the video encoding device via a second communications channel, the video data;
receive, at the video processing service, from the computing device, a request to restart video processing of new video data generated by the video source device;
send, by the video processing service to the video encoding device via the first communications channel, one or more messages indicating a command to restart video transmission to the video processing service, wherein the message includes a new encryption key to be used by the video encoding device for encrypting the new video data;
send, by the video processing service to the video decryption engine, a new decryption key to be used by the video decryption engine to decrypt the new video data; and
receive, at the video processing service from the video encoding device via the second communications channel, the new video data.

16. The system of claim 15, the video processing service including further instructions that, upon execution one or more processors of the video processing service, further cause the video processing service to determine that the video source device is associated with the video encoding device.

17. The system of claim 15, the video processing service including further instructions that, upon execution one or more processors of the video processing service, further cause the video processing service to obtain, from a key management service, the encryption key and the decryption key.

18. The system of claim 17, wherein the key management service is executed by one or more computing devices of the provider network.

19. The system of claim 15, wherein sending the encryption key comprises using a bidirectional protocol.

20. The system of claim 17, wherein the encryption key and the decryption key are generated by the key management service using a symmetric encryption algorithm.

* * * * *